Dec 24, 1940 G. R. TREMOLADA Re. 21,677

SUSPENSION HYDRAULIC SWIVEL AND FEED FOR ROTARY WELL DRILLING

Original Filed May 22, 1936 3 Sheets-Sheet 1

INVENTOR:
Guglielmo R. Tremolada,
BY
Alan Franklin
ATTORNEY.

SUSPENSION HYDRAULIC SWIVEL AND FEED FOR ROTARY WELL DRILLING

Original Filed May 22, 1936 3 Sheets-Sheet 2

INVENTOR:
Guglielmo R. Tremolada,
BY
Alan Franklin
ATTORNEY.

SUSPENSION HYDRAULIC SWIVEL AND FEED FOR ROTARY WELL DRILLING

Original Filed May 22, 1936 3 Sheets-Sheet 3

INVENTOR:
Guglielmo R. Tremolada,
BY
Alan Franklin
ATTORNEY.

Reissued Dec. 24, 1940

Re. 21,677

UNITED STATES PATENT OFFICE 21,677

SUSPENSION HYDRAULIC SWIVEL AND FEED FOR ROTARY WELL DRILLING

Guglielmo R. Tremolada, Los Angeles, Calif.

Original No. 2,099,779, dated November 23, 1937, Serial No. 81,167, May 22, 1936. Application for reissue September 19, 1938, Serial No. 230,747

7 Claims. (Cl. 255—19)

This invention relates to swivels, feeds and retraction means for rotary well-drilling apparatus.

In the operation of rotary well-drilling apparatus the great weight of the drill string on the conventional metallic thrust bearing swivel wears out said swivel in a short time, often within twenty-four hours. Such swivels are expensive, and their frequent failure adds materially to the cost of drilling operations.

In feeding the drill bit in deep wells the great weight of the drill string, amounting at times to several hundred tons, must be relieved from the bit and the bit controlled in such manner that it will engage the bottom of the well under no greater pressure than the weight necessary for drilling; otherwise the bit will deviate from the perpendicular, by following a soft formation, and will drill a crooked hole, or the bit will dig into the earth too rapidly and twist off the drill string. Various means are at present employed, in conjunction with the conventional metallic thrust bearing swivel, for maintaining the proper pressure on the drill bit, such as the electric differential motor lift, the hydraulic lift and other means. Such means, however, are all extra equipment, added to the conventional drilling apparatus, which are cumbersome and expensive, and are employed only for the control of the weight on the drill string.

The general object of my invention is to provide a combined hydraulic cushion suspension swivel and feed for rotary well-drilling apparatus.

Another object is to provide a hydraulic swivel for rotary well drilling apparatus, whereby the entire weight of the drill string is suspended and revolved upon a body of liquid, thus eliminating the great wear and frequent replacement of the conventional metallic thrust bearing swivel, and increasing the life of the swivel indefinitely.

Another object is to provide an improved hydraulic feed for rotary well drilling apparatus, which will feed the drill bit smoothly and will enable accurate measurement of the pressure or weight of the drill bit in order to prevent the application of excessive pressure on the bit.

Another object is to provide a feed for rotary well-drilling apparatus, the stroke of which may be increased to the length of the kelly, thus eliminating the frequent retracting operations required in the present rotary well-drilling apparatus.

Other objects and advantages will appear hereinafter as this specification progresses.

Figure 1:
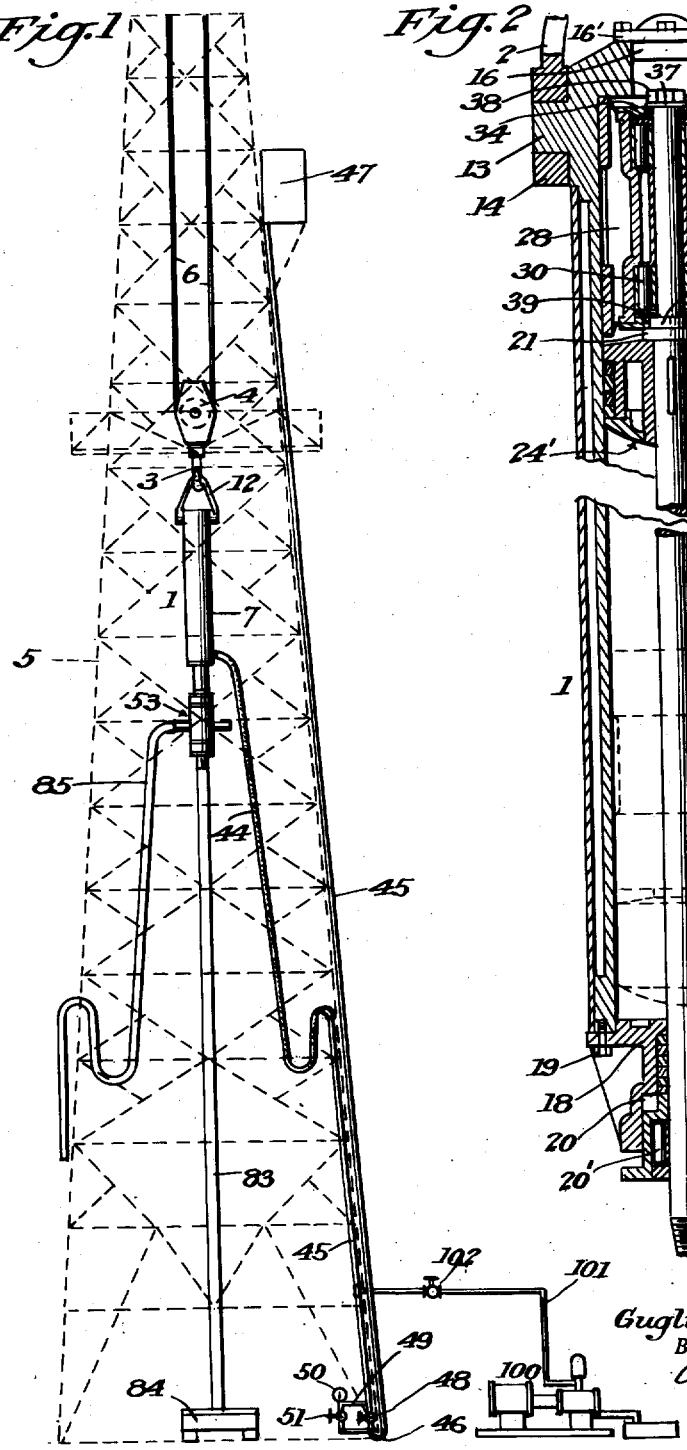
Fig. 1 is a side elevation of an oil well derrick equipped with my invention.
Figure 2:
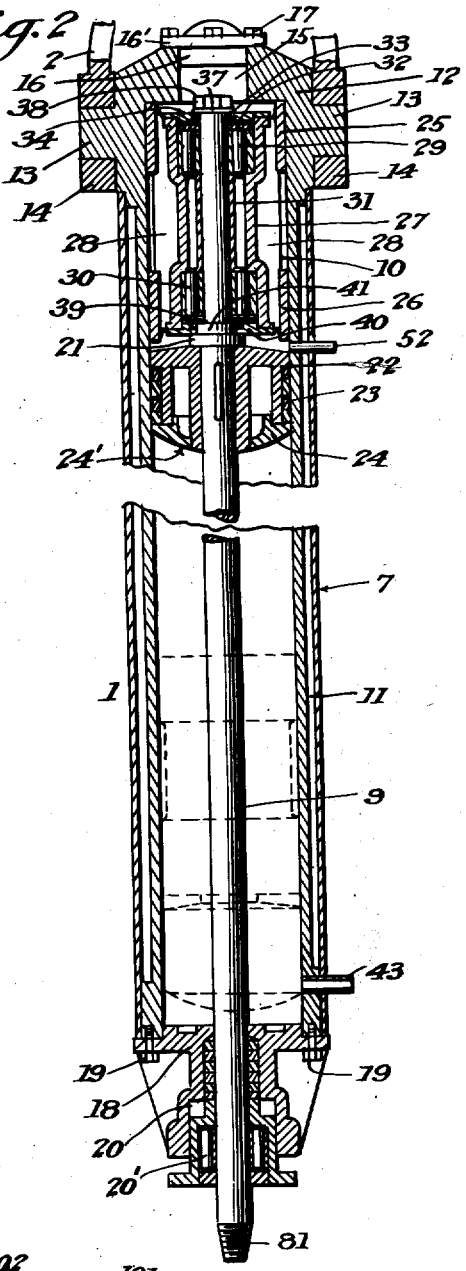
Fig. 2 is a vertical longitudinal section of my hydraulic swivel and feed.
Figure 3:
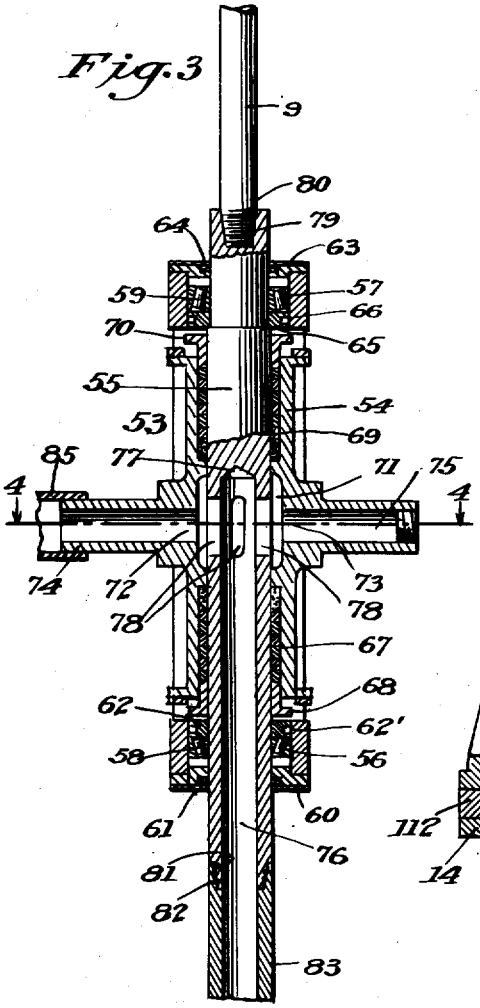
Fig. 3 is a longitudinal section of the mud swivel joint.
Figure 4:
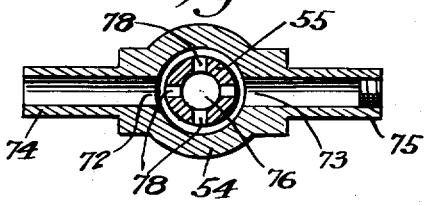
Fig. 4 is a horizontal section of the mud swivel joint taken on line 4—4 of Fig. 3.

Referring more particularly to the drawings, in which corresponding parts are designated by the same reference characters in all the figures, 1 designates my hydraulic swivel and feed in its entirety, which is suspended at its upper end by a bail 2 from the hook 3 of a traveling block 4 in a derrick 5, said traveling block being suspended by a cable 6 from a crown block (not shown) on the top of said derrick.

My invention includes a cylinder 7, piston 8, and piston rod 9, and slidable guide 10, said guide being positioned in said cylinder above said piston. The cylinder 7 is formed with a cooling jacket 11, surrounding the same, in which jacket is placed water, air or other cooling medium for preventing overheating of said cylinder. The cylinder 7 is constructed with a head 12 at its upper end, which head is formed with a pair of horizontal trunnions 13, received within the bearing 14, at the lower ends of the bail 2. Said head is provided with a central bore 15 through its upper wall to provide access into the upper end of the cylinder 7, said bore being normally closed at its upper end by a plug 16 formed with an external flange 16', which rests upon the top of the head 12 and is bolted to the head by bolts 17, whereby the bore 14 is detachably closed by said plug. The lower end of the cylinder 7 is closed by a head 18, which is bolted thereto by bolts 19, said head being constructed with a packing box 20, and a roller bearing 20' through which the piston rod 9 extends. The piston 8 is keyed on the piston rod 9, with its upper end against an enlargement 21 on said rod, and said piston is constructed with a peripheral recess 22, extending upwardly from the lower end thereof, to receive a hydraulic packing 23, which is maintained in said recess by a gland 24, secured in the lower end of said piston, said packing engaging the inner surface of the cylinder 7 to seal the liquid in the cylinder below said piston. The lower side 24' of the piston gland 24 is preferably spherical to provide a better hydraulic cushion effect of the piston 8, and reduce the eddy currents in the liquid in the cylinder and the heat generated thereby to a minimum. The slidable guide 10 is constructed with annular rings 25 and 26 and with a bearing housing 27 within said rings, the ring 25 being spaced above the ring 26, and said rings being joined to said bearing housing by radial longitudinal webs 28. The rings 25 and 26 of the sliding guide 10 are slidably fitted to the inner surface of the cylinder 7. The upper end portion of the piston rod 9 extends upwardly through the bearing housing 27 and is journaled in roller bearings 29 and 30 fitted in the lower and upper ends respectively of said housing. A bearing spacer 31 is fitted on the piston rod 9 within the bearing housing 27 with its upper end engaging the lower end of the roller bearing 29 and its lower end engaging the upper end of the lower roller bearing 30. The upper end of the roller bearing 29 is closed by a thrust washer 32 fitted over the upper end of the piston rod 9 and a sleeve 33 is fitted over the upper end of said rod and rests at its lower end on the upper side of said washer 32. A gland 34 is secured in the upper end of the bearing housing 27 over the washer 32 with the sleeve 33 projecting through the opening 35 in the center of said gland, said gland being constructed with a packing 36 in contact with said sleeve 33 whereby the upper end of the roller bearing is hydraulically sealed. A washer 37 fits over the upper threaded end of the piston rod 9 upon the upper end of the sleeve 33 and a nut 38 screws on said upper threaded end of said piston rod against said washer 37, thus holding the gland 34 in position in the upper end of the bearing housing 27. The lower end of the roller bearing 30 is closed by a washer 39 fitted over the upper end portion of the piston rod 9 upon the upper end of the enlargement 21. A gland 40 is secured in the lower end of the bearing housing 27 beneath the washer 39 and rests upon the enlargement 21 with the upper reduced portion 41 of said enlargement projecting upwardly through the opening in said gland, said gland being constructed with a packing 42 in contact with said reduced portion of said enlargement, whereby the lower end of the roller bearing 30 is hydraulically sealed. A nipple 43 projects through the lower end of the cylinder 7 and is connected to the upper end of a flexible hose 44, the lower end of which hose being connected to one end of a pipe 45 located at one side of the derrick 5, which pipe extends downwardly from said hose to the lower part of the derrick where it is bent at 46 upon itself and extends upwardly into the bottom of a fluid tank 47 mounted on the upper part of the derrick 5. In said pipe 45 near the floor of the derrick is provided a valve 48 for controlling the fluid, preferably soluble oil, supplied to the cylinder 7 through said pipe from the tank 47, for raising or lowering the piston 8 in said cylinder. A U-shaped pipe 49 is connected at its ends to the pipe 45 at opposite sides respectively of the valve 48, to which pipe 49 is connected a pressure indicator 50. A bleeding valve 51 is interposed in the pipe 49. From the cylinder 7, at a point immediately above the piston 8, when said piston is at the upper end of its stroke, leads a drain pipe 52 for leakage upwardly past said piston.

A mud joint 53 is provided for the circulation of mud downwardly through the drill string, around the drill bit, and upwardly through the well in the usual manner. Said mud joint comprises a casing 54, a spindle 55 extending through said casing, and roller bearings 56 and 57 mounted respectively in the lower end and upper end of said casing, on which bearings said spindle is journaled to rotate in said casing. The rollers 58 and 59, respectively, of the bearings 56 and 57, are conical and are disposed at an angle to support the casing 54 on the spindle 55. The lower end of the casing 54 is closed by a gland 60 surrounding the spindle 55 and constructed with a packing 61 in contact with said spindle, which packing seals the lower end of the roller bearing 56 around the spindle. A ring 62 is secured on the spindle 55 above the roller bearing 56 and is constructed with a peripheral packing 62' in contact with the inner surface of the casing 54, which packing seals the upper end of the roller bearing 56. The upper end of the casing 54 is closed by a gland 63 surrounding the upper end of the spindle 55 and constructed with a packing 64 in contact with the spindle, which packing seals the upper end of the roller bearing 57 around the spindle. A ring 65 is fitted on the upper portion of the spindle 55 immediately below the roller bearing 57, and is constructed with a peripheral packing 66 in contact with the inner surface of the casing 54, which packing seals the lower end of the roller bearing 57. The bore of the casing 54 is enlarged slightly above the lower roller bearing 56 to receive a packing 67 and a gland 68 to maintain said packing in said enlarged bore around the spindle 55. The bore of the casing 54 is also enlarged slightly below the upper roller bearing 57 to receive a packing 69 and a gland 70 to maintain said packing in said enlarged bore around said spindle. The casing 54 is enlarged internally intermediate its ends to provide an annular mud-circulating space 71 surrounding the spindle 55, and said casing is provided with mud inlets 72 and 73 leading into said space from opposite sides of the casing 54. Nipples 74 and 75 are secured to the outside of the casing 54 in communication with said inlets respectively. The spindle 55 is provided with a bore 76 extending upwardly in the spindle from its lower end to a point 77 coinciding with the upper end of annular mud-circulating space 71 in the casing 54. The spindle 55 is provided with a plurality of elongated mud inlets 78 leading from the space 71 into the upper end of the spindle bore 76. The upper end of the spindle 55 is formed with a "box" 79 to receive a "pin" 80 on the lower end of the piston rod 9, whereby the mud joint 53 is detachably connected to the lower end of said piston rod. The lower end of the spindle 55 is formed with a "pin" 81 for engaging a "box" 82 in the upper end of the kelly 83 of a conventional rotary drill string for detachably connecting the upper end of said kelly to the lower end of said spindle, said kelly extending downwardly through the turntable 84 on the floor of the derrick 5. A hose 85 leading from a mud pump (not shown) is connected to either nipple 74 or 76 for circulating mud through the joint 53 and drill string to the bit in the well.

The operation, uses and advantages of my invention are as follows:

The cylinder 7, together with the mud joint 53, kelly 83 and drill string are raised by the draw works, until only the lower end of the kelly remains in the turntable 84 and the piston 8 rests upon a liquid cushion in the lower end of said cylinder below the drain 42, and the lower end of the kelly is secured in the turntable by slips. The cylinder 7 is then lowered by the draw works until the piston 8 reaches its uppermost position in said cylinder, while the valve 48 is opened so that liquid flows from the tank 47 through the pipe 45 and said valve, and through the hose 44, into the lower end of the cylinder 7 until said cylinder is filled with liquid below the piston 8. The valve 48 is then closed, the slips are removed from the turntable and kelly and the bleed valve 51 is opened sufficiently to allow only a small amount of liquid to pass through it under a predetermined pressure of the piston 8 on the liquid in the cylinder, corresponding to the pressure of the drill against the bottom of the well required for drilling. The liquid passing through the bleed valve 51 passes up through the pipe 45 into the tank 47 on the upper part of the derrick 5. The piston 8 then descends, under the influence of the weight of the drill string against the head of the liquid in the cylinder, functioning as a hydraulic feed, while the turntable 84 is rotated in the usual manner, whereby the kelly 82 and drill string, together with the mud joint spindle 55, piston rod 9 and piston 8, are rotated, the piston rotating upon the liquid in the cylinder 7 functioning as a hydraulic swivel, and the drill bit drills the well hole to a depth equal to the length of the stroke of the piston 8 in the cylinder 7, whereupon the piston 8, upon reaching the lower end of its stroke, automatically closes the outlet nipple 43, and rests upon a cushion of liquid in the lower end of said cylinder below said nipple after forcing all of the liquid above said liquid cushion out of the cylinder through said nipple, hose 44 and pipe 45. Slips are then inserted in the rotary table to hold the drill string, and the cylinder 7 is lowered by the draw works until the piston 8 again reaches its uppermost position in the cylinder, while the valve 48 is opened to permit fluid to fill the cylinder below the piston. The valve 48 is then closed, the slips removed from the rotary table, and the bleed valve 51 opened, and the drill string lowered further the length of the stroke of the piston in the cylinder. The above-described operations of the cylinder and piston for lowering the drill string for drilling are repeated. When the drill bit has drilled the well hole to such depth that the upper end of the kelly descends to the turntable 84, the cylinder 7, kelly 83 and drill string are raised by the draw works until the upper end of the drill string projects through the turntable, whereupon slips are inserted in the turntable, the kelly 83 is unscrewed from the upper end of the drill string, and another section of pipe is introduced between the upper end of the drill string and the lower end of the kelly and connected thereto. The slips are then removed from the turntable, and the cylinder 7, kelly 83 and the drill string are lowered by bleed valve 51 until the lower end of the kelly enters the turntable 84, whereupon the above described operations are repeated until the well is drilled to the proper depth.

Figure 5:
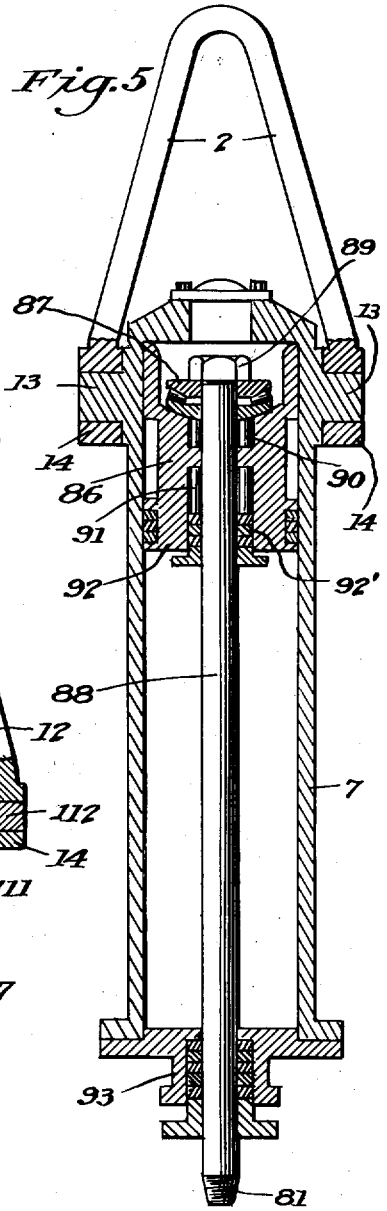
Fig. 5 is a longitudinal section of a modified form of my invention, embodying my suspension hydraulic feed and a metallic thrust bushing bearing swivel.
Figure 7:
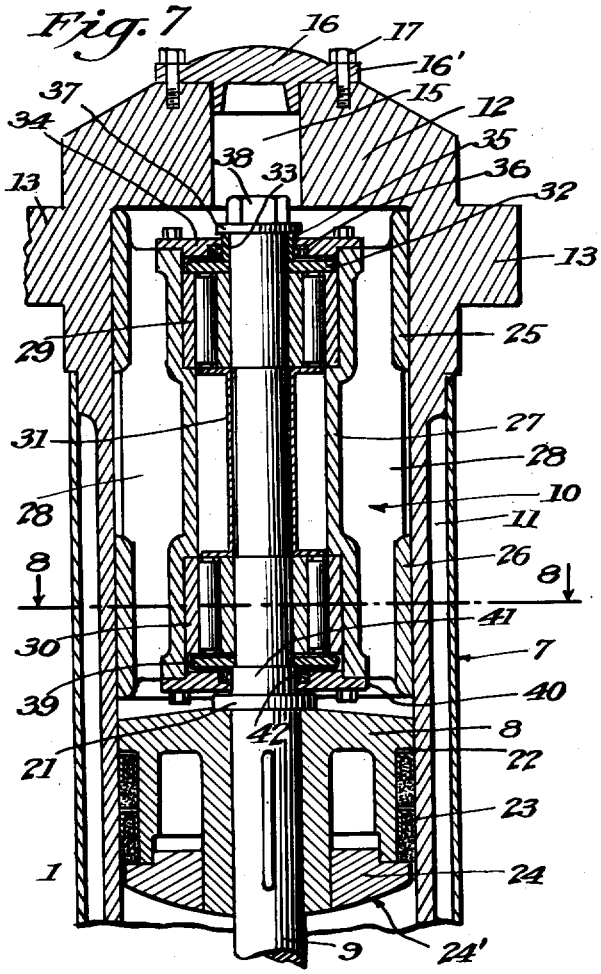
Fig. 7 is an enlarged fragmentary longitudinal section of my invention, showing the piston and slide in their uppermost position in the cylinder.

In the form of my invention shown in Fig. 5, the guide 10 is eliminated, a piston 86 is substituted for the piston 8 and an end thrust roller bearing 87 is mounted in the upper end of said piston for sustaining the load of the drill string on said piston through a piston rod 88, which extends through said piston, there being a nut 89 on the upper end of said piston rod engaging said end thrust bearing. The piston rod 88 is journaled in roller bearings 90 and 91 in the piston 86, so that said rod may rotate in said piston. A packing box 92, containing a packing 92' is provided in the lower portion of the piston for packing the piston rod 88, and sealing the lower end of the roller bearing 91. A packing box 93 is provided in the lower end of the cylinder 7 through which the rod 88 rotatably extends.

Figure 6:
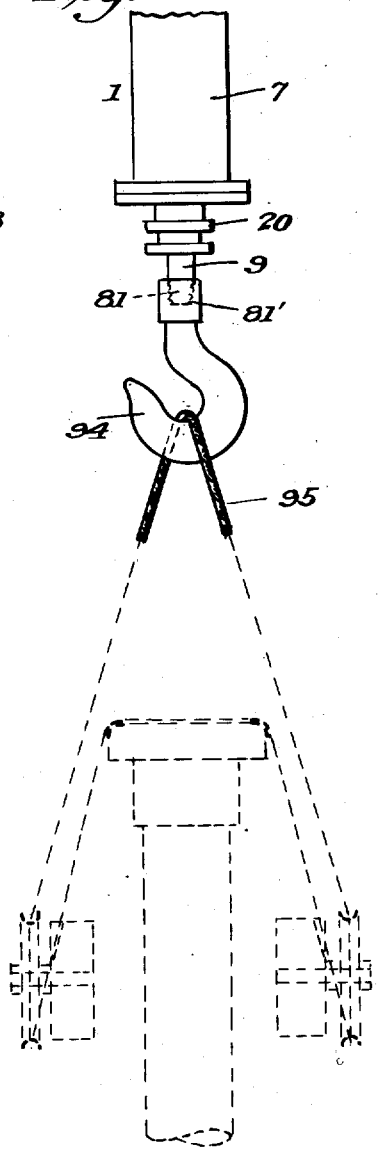
Fig. 6 is an elevation of my invention with the mud joint disconnected therefrom, and showing a snubbing hook screw seated on the lower end of the piston rod and engaging the cable of a snubbing means for snubbing the drill string into a well hole.
Figure 8:
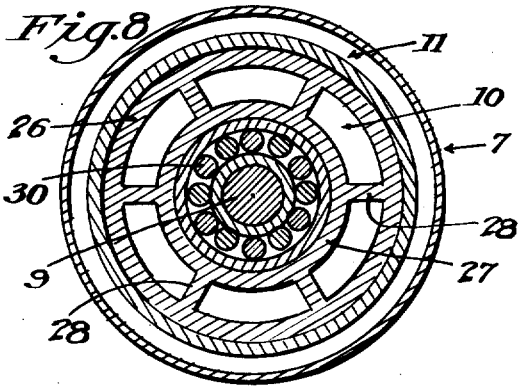
Fig. 8 is a horizontal section of my invention taken on line 8—8 of Fig. 7.

In Fig. 6 the mud joint 53 has been disconnected from the lower end of the piston rod 9 and a snubbing hook 94 is screw seated on the "pin" 80 on the lower end of said rod for engaging a snubbing cable 95, which cable extends over the conventional sheaves (not shown) on the derrick floor or rotary table and is connected to the conventional snubbing bar (not shown) on the upper end of a drill string for snubbing said drill string into a well hole against gas pressure therein.

Means, comprising a fluid pump 100, a pipe 101 leading from said pump and connected to pipe 45 between the cylinder 7 and valve 48, and a valve 102 in said pipe, are provided for lifting the drill string hydraulically, which might be desirable at times. By closing the valve 48 and opening the valve 102, the pump 100 may be operated to pump fluid through pipes 101 and 45, and hose 44 into the cylinder 7 to raise the piston 8 and the drill string.

Figure 9:
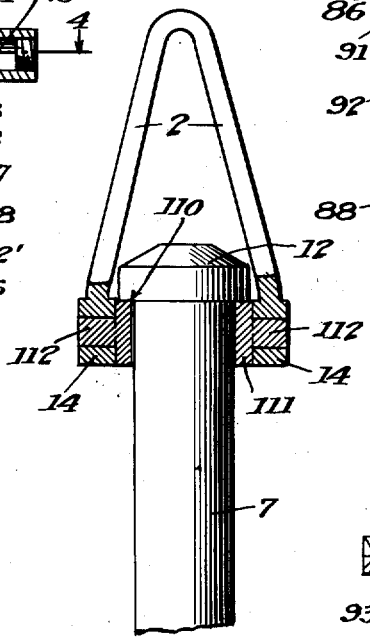
Fig. 9 is a fragmentary elevation of my invention showing a modified form of suspension means.

In Fig. 9, I have illustrated a modified form of suspension means for my swivel and feed, which comprises an external shoulder 110 on the cylinder head 12, and a collar 111 surrounding the cylinder 7 and engaging said shoulder, said collar being formed with trunnions 112 received within the bearings 14 of the bail 2.

I do not limit my invention to the exact construction herein disclosed, because various changes may be made therein without departing from the spirit of the invention.

I claim:

1. In a rotary well-drilling apparatus, a cylinder suspended from the traveling block of said apparatus, a piston rotatably mounted in said cylinder, a guide mounted in said cylinder, a piston rod extending through said piston and said guide, and secured in said piston, a roller bearing in said guide in which said rod is journalled, said piston rod extending through one end of said cylinder, means for introducing fluid into said cylinder below said piston or allowing said fluid to escape from said cylinder, and means for connecting the drill string to said piston rod.

2. In a rotary well-drilling apparatus, a cylinder, a piston in said cylinder resting upon a body of liquid therein, a sliding guide fitted in said cylinder above said piston, a piston rod extending through said piston and said guide, said rod being keyed to said piston, bearings in said guide in which said rod is journaled, means for hydraulically sealing said rod and said bearings within said sliding guide, said piston rod extending through the lower end of said cylinder, and means for connecting the lower end of said rod to a drill string.

3. In a rotary well-drilling apparatus, a cylinder suspended from the travelling block of said apparatus, means for cooling said cylinder, a piston rotatably mounted in said cylinder, a guide fitted in said cylinder above said piston, a piston rod extending through said piston and said guide and secured to said piston, and a roller bearing in said guide in which said piston rod is journaled, said piston rod extending though one end of said cylinder.

4. In a rotary well-drilling apparatus, a cylinder suspended from a raising and lowering means of said apparatus, a piston rotatably mounted in said cylinder, a guide for said piston axially movable in said cylinder, a piston rod secured to said piston and extending through one end of said cylinder, bearing means cooperating between said piston and said guide, means whereby fluid may be introduced into or withdrawn from said cylinder below said piston, and means for connecting the drill string of said apparatus to said piston rod.

5. In a rotary well-drilling apparatus, a cylinder suspended from a raising and lowering means of said apparatus, a piston rotatably mounted in said cylinder, a guide for said piston movable in axial direction relative to said cylinder, a piston rod secured to said piston and extending through one end of said cylinder, bearing means cooperating between said piston and said guide, a body of fluid in said cylinder below said piston, and means for connecting the drill string of said apparatus to said piston rod.

6. In a rotary well-drilling apparatus, a cylinder suspended from a raising and lowering means of said apparatus, a piston rotatably mounted in said cylinder, a guide for said piston mounted in said cylinder and operatively connected to said piston so as to move along said cylinder with said piston and to make essentially non-rotative engagement with the wall of said cylinder, a piston rod secured to said piston and extending through one end of said cylinder, a body of fluid in said cylinder below said piston, and means for connecting the drill string of said apparatus to said piston rod.

7. In a rotary well-drilling apparatus including a suspension part and a drill string part, a cylinder connected to one of said parts, a piston mounted in said cylinder, said cylinder and piston being relatively rotatable, a guide fitted in said cylinder and operatively connected to said piston so as to move axially with said piston within said cylinder and so that said piston will have rotation relative to said guide, and a piston rod connected to said piston and extending through a wall of said cylinder and connected to the other said parts.

GUGLIELMO R. TREMOLADA.